United States Patent

[11] 3,574,310

| [72] | Inventor | Daniel S. Souriau<br>Paris, France |
|---|---|---|
| [21] | Appl. No. | 868,171 |
| [22] | Filed | Oct. 21, 1969 |
| [45] | Patented | Apr. 13, 1971 |
| [73] | Assignee | Service National dit: Gaz De France<br>Paris, France |
| [32] | Priority | Oct. 23, 1968 |
| [33] | | France |
| [31] | | 171014 |

[54] PRESSURE REDUCER FOR GASEOUS FLUIDS
9 Claims, 5 Drawing Figs.

[52] U.S. Cl. ...................................................... 137/625.3,
251/61.1, 251/368, 138/42
[51] Int. Cl. ........................................................ F16k 7/17
[50] Field of Search........................................... 251/61.1,
368; 137/625.3, 625.28; 138/42

[56] References Cited
UNITED STATES PATENTS

| 3,387,630 | 6/1968 | Routson ..................... | 137/625.3 |

FOREIGN PATENTS

| 917,423 | 2/1963 | Great Britain................ | 251/61.1 |

*Primary Examiner*—Arnold Rosenthal
*Attorney*—Bacon & Thomas

ABSTRACT: A pressure reducer for gaseous fluids in which a porous body is located in a casing with one of its surfaces in fluidtight contact with a support member. The porosity of the member in a direction joining the upstream and of said body to said one surface being large and the porosity in a direction between said one surface and the downstream end of the body being poor. A pneumatically or hydraulically operated membrane controls the flow of gas to the upstream end.

PATENTED APR 13 1971 3,574,310
SHEET 2 OF 3
Fig. 2
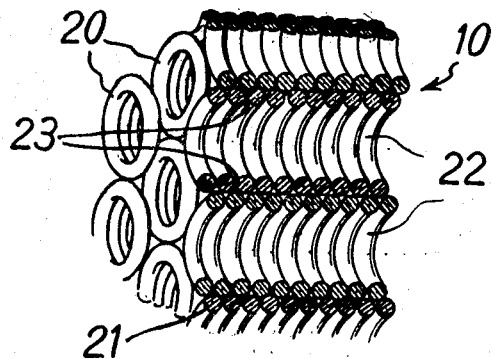
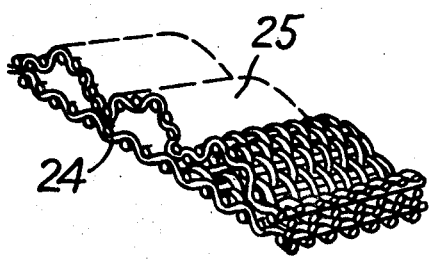
Fig. 3a
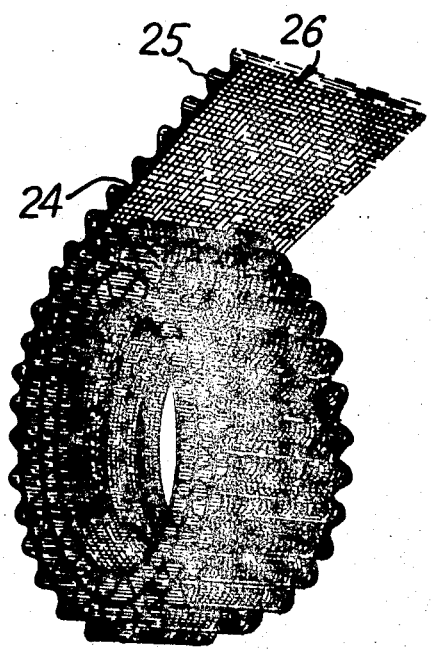
Fig. 3b
Inventor
DANIEL S. SOURIAU
By Bacon & Thomas
Attorneys

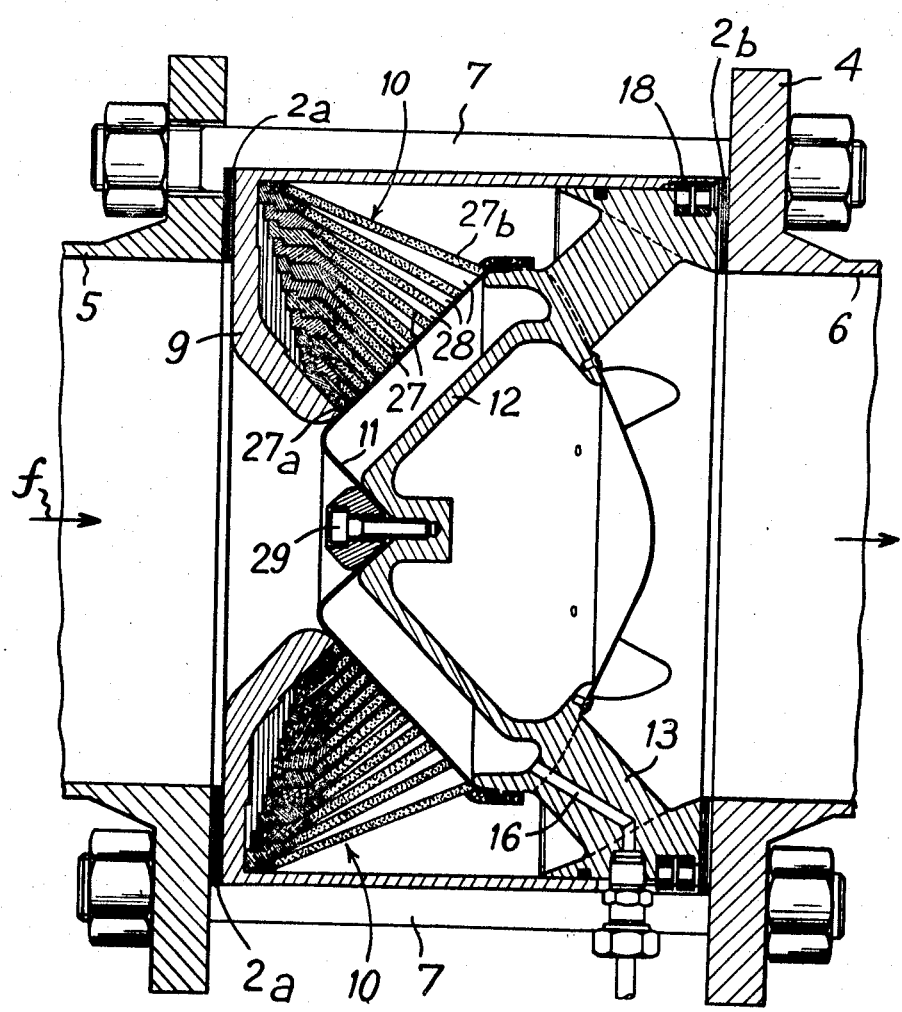

PRESSURE REDUCER FOR GASEOUS FLUIDS

The present invention relates to a silent pressure reducer for gaseous fluids, of the type comprising a hollow body positioned in a casing and extending across all sections of the passage of the latter, and cooperating, at its upstream end, with a control element such as a membrane, operated by pneumatic or hydraulic means.

In a known pressure reducer of this type, the porous body of a homogeneous porosity presents, in axial cross section as viewed in the general flow direction of the fluid, a form which is substantially triangular, one of the two faces defining an acute angle situated on the upstream side of the hollow body cooperating with the membrane, whilst the third face, extending from the upstream to the downstream of the porous body, is in fluid-tight contact with the casing.

Such a known form of pressure reducer does not permit the expansion of a considerable gas load, particularly for minimal pressure differentials between the upstream and downstream which are relatively low, for example of the order of 0.25 atmospheres, the maximal differential pressure remains however relatively superior to that which leads to a critical expansion ratio, for example of the order of 3 atmospheres, the pressure downstream of the porous body being, for example, 1.020 atmospheres absolute.

In effect, if the pressure reducer is intended principally for operation only for relatively small expansions, wholly avoiding the formation of a sonic speed for the gas, when the ratio of expansion exceeds the critical value, one is obliged to provide a porous body having a very short length in the direction of the general flow of the gas and therefore very thin in the perpendicular sense to the upstream face of said porous body. Being given that it is practically impossible for the thickness to be reduced to the order of the dimensions of the grains of the porous body, this difficulty gives rise to porous bodies having a very great length in the third perpendicular direction to the preceding directions. Because of this fact, the pressure reducer must be very cumbersome, and gives rise to the use of very complicated techniques for mounting it in conventional gas pipes.

Moreover, if the ratio between the maximum expansion load and the minimum expansion load and of the ratio between the maximum differential expansion pressure and the minimum differential expansion pressure are very large, the maximum differential pressure remains nevertheless very small and the maximum load relatively large, the porous body must have a form so open mouthed in the downstream sense that the isobars in the porous body deviate extremely divergently to the point of no longer subtending at the limit, a plane angle of $12\pi$. In consequence, it is therefore impossible to avoid the formation of zones where the gas flows with a sonic speed which makes the pressure reducer noisy.

The object of the present invention is to overcome or reduce the disadvantages mentioned above, and has notably for its object the provision of a silent pressure reducer of the type previously mentioned, which permits expanding the gas at very wide range of differential pressures, where the lower differential pressure limit is of the order of a quarter of an atmosphere.

According to the present invention, there is provided a pressure reducer for gaseous fluids, comprising a hollow casing with a porous body located therein, a support member supporting said body in the casing, the porous body having upstream and downstream surfaces and a further surface in fluid-tight contact with said support member, a pneumatically or hydraulically operated control membrane in contact with the upstream surface, an inlet to the casing communicating with the membrane and thence to the upstream surface, an outlet to the casing communicating with the downstream surface, the body having a large porosity in a first direction joining said upstream surface to said further surface, and having a poor porosity in a second direction, transverse to said first direction, joining said further surface to said downstream surface.

In this fashion, the thickness of the porous body between its upstream surface and said further surface can be sufficiently large with respect to its thickness in the second direction, i.e. the direction of poor porosity or permeability, and the section of the passages offered to the gas perpendicular to that direction of poor permeability can be large without the dimension of the porous body, perpendicular to the plane containing the first and second directions attaining a prohibitive value.

Thus, the disposition of the isobars in the porous body being determined once and for all, since these are orientated along the direction of large porosity in the porous body, the ratio between the degree of maximum and minimum expansion of the gas and the ratio between the minimum and maximum load of the gas are not for practical purposes limited. In effect, to avoid the porous body parts having differential passages for the gas, according to the invention, one is not obliged to give to the downstream face a shape which is very divergent, particularly if the porous body presents a bellmouthed form between its upstream face and its downstream face.

In order that the invention may more readily be understood, the following description is given, merely by way of example, reference being made to the accompanying drawings in which:

FIG. 2 is a detailed view, in perspective, of one form of porous body for use in the pressure reducer according to the invention;

FIGS. 3a and 3b are perspective views of other examples of porous body; and

FIG. 4 is an axial cross section through another embodiment of silent pressure reducer according to the invention.

Figure 1:
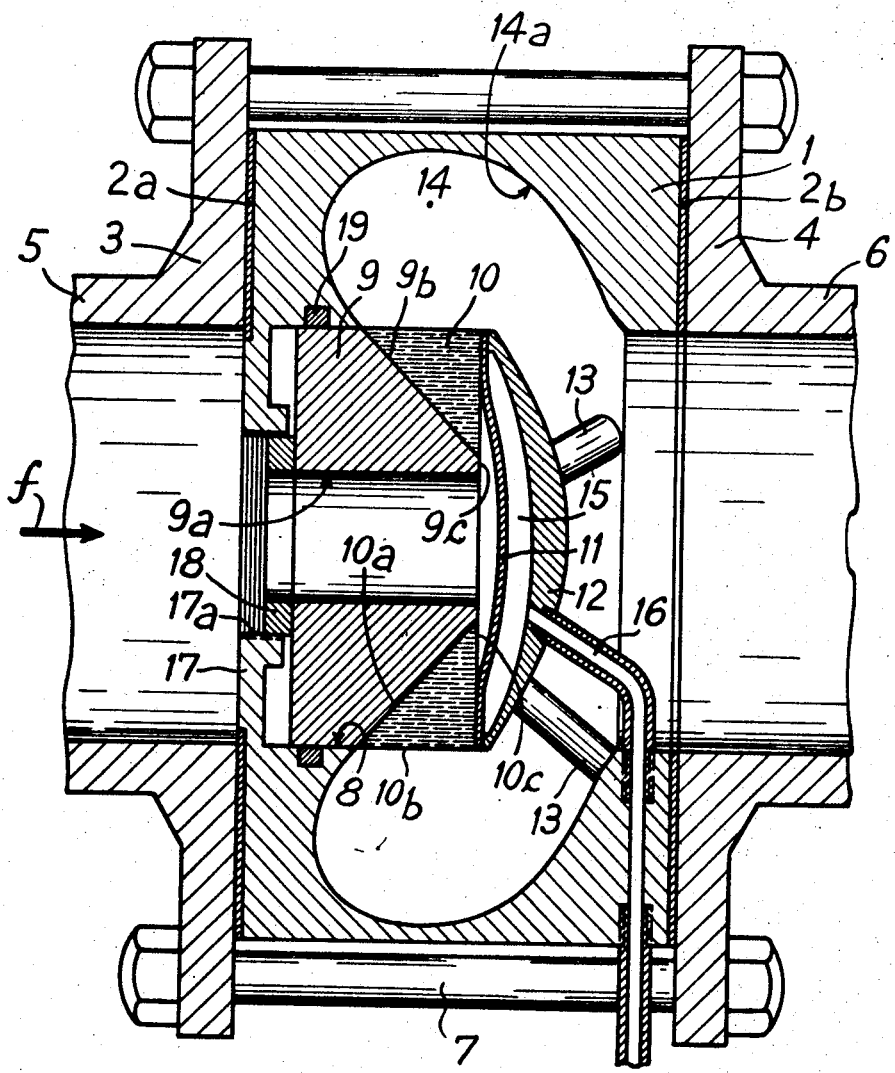
FIG. 1 is an axial cross section of a first embodiment of pressure reducer according to the invention.

IN FIG. 1, the casing 1 of the silent pressure reducer according to the invention, has a cylindrical exterior form and is provided with two gaskets 2a and 2b and located between two flanges 3 and 4 at the ends of an upstream pipe 5 and downstream pipe 6, the two flanges 3 and 4 being clamped in position by means of fixing bolts 7.

At its upstream end as determined by the directions of flow of the gas as indicated by the arrow $f$ the casing 1 is provided with a cylindrical bore 8 serving to accommodate a support member 9 for a porous body 10. The support 9 is furnished with a central passage 9a coaxial with the pipes 5 and 6 and having at its downstream extremity a frustoconical periphery. 9b terminating in an annular face 9c perpendicular to the passage 9a.

The porous body 10, as shown in the drawings, is a body of revolution, and has, in axial, radial cross section, for example, the form of a triangle, such that it rests in a fluid-tight manner, with the face constituted by the hypotenuse 10a of said triangle resting on the frustoconical periphery 9b. The other faces 10b and 10c are aligned with the cylindrical external face of the support 9b and with the annular face 9c. Thus, the assembly constituted by the support 9 and the porous body 10 have the form of a right hollow cylinder.

The upstream face of the porous body 10, constituted by the face 10c, cooperates with a control element, such as a circular membrane 11, of which the edge is secured in a fluid-tight fashion against the exterior edge of the upstream face 10c of the porous body 10 by a shell 12 propped in position by flanges 13 on the internal walls 14a of a chamber 14 constituting the downstream chamber of the pressure reducer, and being connected to the downstream pipe 6.

The membrane 11, and the shell 12, define a chamber 15 connected by a conduit 16 to a source of fluid (not shown) and acting on the membrane 11 on the wall opposite to the upstream pipe 5. As can be seen from FIG. 1, the support 9, the porous body 10, the membrane 11 and the shell 12 are located at the interior of the downstream chamber 14 of the pressure reducer, the frustoconical face 9b being aligned, at its external perimeter, with the internal wall 14a of the chamber 14.

The upstream face of the bore 8 in the casing 1 is closed by a shoulder 17 directed towards the axis and comprising a central threaded portion 17a in which is engaged a fixing screw 18 which forces the assembly comprising the support 9, porous body 10, membrane 11, shell 12 and flanges 13 against the internal wall 14a of the downstream chamber 14. A fluid-tight gasket 19 between the bore 8 and the support 9 blocks the passage of fluid directly from the upstream pipe 5 to the downstream chamber 14.

The porous body 10, according to the invention, presents an anisotropic permeability. More particularly, the porous body 10 has a large porosity or permeability in a first direction substantially perpendicular to the upstream surface 10c, and orientated towards the further surface 10a and a poor porosity or permeability in a second direction orientated from this further surface 10a and a poor porosity or permeability in a second direction orientated from this further surface 10a substantially perpendicular to the downstream surface 10b and transverse to the first direction strong porosity. The porosity in a direction which is perpendicular to the plane containing the first and second directions can have any value. The order of magnitude of the porosity measured in the second direction is between a few microns and a few millimetres and the porosity in the first direction can be between a few microns and a few centimeters. According to one advantageous embodiment of the invention, this anisotropic permeability is provided by thin zones having a poor porosity alternating and communicating with zones having a large porosity. The zones of large porosity open on the upstream surface 10c of the porous body 10, and are closed on the further surface 10a, and are closed on the opposite upstream surface face 10b by the frustoconical periphery 9b of the support 9 and are, preferably substantially parallel to themselves. The zones of poor porosity are parallel to themselves, and, preferably, so are the zones of large porosity. These are rendered fluid-tight on their lateral walls, that is to say on the upstream surface 10c, and on downstream surface 10a, in the region of the support 9. On the other hand, the zones of poor porosity open always in a zone of large porosity, and finally, the last downstream zone of poor porosity terminates on the downstream surface 10b of the porous body 10, and opens into the downstream chamber 14 of the pressure reducer.

As can equally be seen from FIG. 1, the zones of poor porosity, and those of large porosity, increase successively at the surface starting from the upstream extremity of the upstream face 10c towards the downstream surface 10b of the porous body. Therefore, according to the extent of covering of the upstream surface 10c, the porous body 10 by the membrane 11, the fluid enters the porous body 10 through the zones of large porosity, and particularly, through the last zone of large porosity of which the lateral wall is again covered by the membrane 11, leaves without appreciable pressure drop in this zone of large porosity, then traverses uniformly the neighboring downstream zone of poor porosity, flows uniformly in the following zone of large porosity of which the lateral upstream wall is still closed by the membrane 11, then flows through the following downstream zone of weak porosity, and so on, loosing pressure uniformly and excessively in the zones of poor porosity, until the fluid at last arrives in the downstream chamber 14 after having traversed the last zone of poor porosity which is at the downstream face 10 b of the porous body 10.

In FIG. 2 there is shown a detail of a porous body 10 illustrating one embodiment in which zones are provided of poor porosity and large porosity. The porous body 10 is constituted by a pack of rolled yarns or filaments in the manner or a helicoidal spring forming a roll 20 of which the turns 21 are closely adjacent. The rolls 20 are substantially parallel to one another and touch at the turns 21. The zones of large porosity 22 are thus constituted by the internal part of each roll 20 and by the space defined by the external periphery of a number of rolls 20 in contact with one another, so that the zones of poor porosity 23 are defined by the free spaces between the turns which are closely adjacent to one another, of one roll to turn other adjacent rolls.

The turns 21 of the rolls 20 are, preferably, secured firmly by welding, brazing or sticking. The filaments can be formed from metal, a plastic material or glass fibers. Preferably the filaments are twisted and have a noncircular, e.g. polygonal cross section, so that when they are wound to form the rolls a narrow space is formed with, certainty between adjacent turns of each roll.

According to a second embodiment, as illustrated in FIGS. 3a and 3b, the porous body is constituted by meshes of filaments 24 and 25, woven very fine, the first mesh 24 being flat and the second mesh 25 being undulating and fixed to the first, to provide a band 26, similar in construction to corrugated cardboard. This band when it is rolled up (see FIG. 3), forms a porous body in which the zones of poor porosity are provided by the free spaces between the filaments of the meshes, and the zones of large porosity are defined by the large spaces between the two meshes. There again, the two meshes are secured to one another, e.g. by welding, and the adjacent turns of the spirally rolled band 26 may be similarly secured.

In FIG. 4 there is illustrated a further embodiment of pressure reducer, which is generally similar to that shown in FIG. 1, and like parts have been given like reference numerals. The porous body 10 comprises a series of substantially coaxial, hollow, spaced-apart, frustoconical, porous members 27, having a poor porosity, and fixed at their larger bases to the support member 9, and cooperating at their smaller bases with the membrane 11. The surface area of the members 27 increase progressively starting from the upstream member 27a to the downstream member 27b. Between two adjacent members 27 is left a free space 28 communicating with the upstream pipe 5, when it is uncovered by the membrane 11. In this embodiment the membrane 11 is fixed to the center of the shell 12 by a clamping bolt 29. The various members 27 form the zones of poor porosity and the various spaces 28 the zones of high porosity.

I claim:

1. Pressure reducer for gaseous fluids, said reducer comprising, in combination:
   a. a hollow casing;
   b. a porous body located within said casing;
   c. an upstream and a downstream surface to said porous body;
   d. a support member effective to support said porous body in said hollow casing;
   e. a further surface to said porous body in fluid-tight contact with said support member;
   f. a flexible membrane in contact with said upstream surface of said porous body;
   g. hydraulic or pneumatic supply means effective to control movement of said membrane towards and away from said upstream surface;
   h. an inlet to said casing effective to feed gaseous fluid to said membrane and thence to said porous body;
   i. an outlet to said casing in communication with said downstream surface of said porous body;
   j. a large porosity to said porous body in a first direction joining said upstream surface to said further surface; and
   k. a poor porosity to said porous body in a second direction joining said further surface to said downstream surface, said second direction being transverse to said first direction.

2. Pressure reducer as claimed in claim 1, wherein said further surface is frustoconical and said support member is of operating frustoconical form.

3. Pressure reducer as claimed in claim 1, wherein said porous body includes thin zones of poor porosity alternating and communicating with zones of large porosity, said zones being laterally defined by said support member and said membrane.

4. Pressure reducer as claimed in claim 3, wherein said porous body comprises a pack of a plurality of helically wound filament oils, wherein each of said coils has an axis, wherein said axes are substantially parallel, and wherein said cells are secured together.

5. Pressure reducer as claimed in claim 4, wherein said coil filaments are twisted and are of nonround cross section.

6. Pressure reducer as claimed in claim 4, wherein said coils are secured together at a number of different points.

7. Pressure reducer as claimed in claim 3, wherein said porous body comprises a mesh band including a first flat mesh and a second undulating mesh secured thereto, said mesh band being rolled spirally to form said porous body.

8. Pressure reducer as claimed in claim 3, wherein said porous body comprises a plurality of substantially conical hollow members of poor porosity, spaced apart from one another to form passages of large porosity.

9. Pressure reducer as claimed in claim 8, wherein said conical hollow members are frustoconical.